H. M. MARTIN.
PROCESS AND APPARATUS FOR TREATING STORAGE BATTERY PLATES.
APPLICATION FILED APR. 6, 1920.
1,402,631.
Patented Jan. 3, 1922.
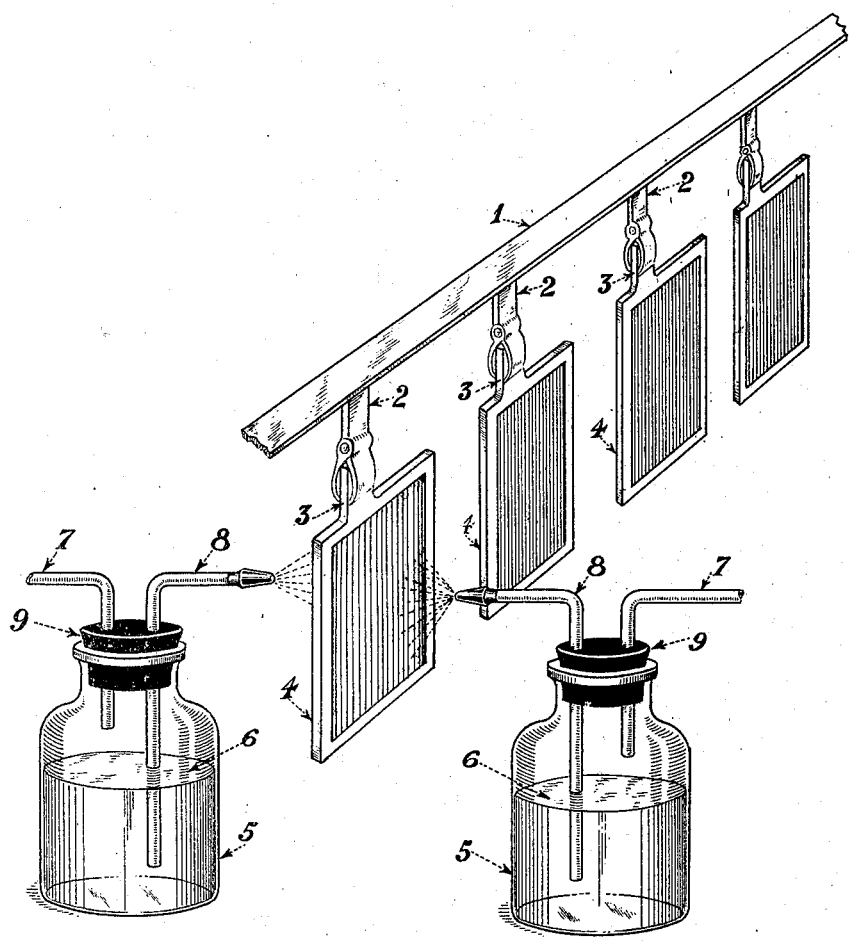
Inventor
HAROLD M MARTIN
By his Attorney
Morris Hirsch.

UNITED STATES PATENT OFFICE.

HAROLD M. MARTIN, OF NEW YORK, N. Y., ASSIGNOR TO PHILADELPHIA STORAGE BATTERY COMPANY, OF PHILADELPHIA, PENNSYLVANIA, A CORPORATION OF PENNSYLVANIA.

PROCESS AND APPARATUS FOR TREATING STORAGE-BATTERY PLATES.

1,402,631.   Specification of Letters Patent.   Patented Jan. 3, 1922.

Application filed April 6, 1920. Serial No. 371,755.

*To all whom it may concern:*

Be it known that I, HAROLD M. MARTIN, a citizen of the United States, and a resident of New York city, in the county of New York and State of New York, have invented certain new and useful Improvements in Processes and Apparatus for Treating Storage-Battery Plates, of which the following is a specification.

This invention relates to the manufacture and treatment of storage battery plates and has its more particular application to the negative element of lead storage batteries. The invention is primarily concerned with a process for treating the negative plates that are the product of the process described and claimed in my Patent No. 1,310,871 of July 22nd, 1919.

In the patent referred to I provide a process for treating the negative storage battery plates of spongy lead by means of a heated gas inert to the material of the plates. This treatment results in a plate of pure spongy lead that, if kept dry, can be transported and stored without need for recharging prior to assembly of the battery. The negative plates as described in the patent referred to are in a practically metallic state and structurally in a crystalline and sponge like form that offers the desirably large active surface relative to the size of the plate.

These dry battery plates when subjected to the rough treatment which is sometimes experienced in commercial handling, packing, boxing and transportation may have portions of the active metal broken away from the supporting parts of the plate which is, of course, undesirable.

By my invention, I provide a process of treatment which can be readily and expeditiously carried out upon the dry negative plates mentioned in the foregoing, for the purpose of materially strengthening the lead plates and rendering them less brittle without, however, in any way diminishing the capacity of the battery of which these plates are to be a part.

It will be understood that my improved method is applicable to the treatment of dry negative plates regardless how made and dried, though the process is preferably carried out upon negative plates previously treated according to the specific method made the subject-matter of my patent above referred to.

In its essence my process consists in applying in intimate contact with parts of the surface of the plate, some substance which will strengthen the plate structure. It will be understood that by the term "surface" as used in certain of the claims, I mean those parts of the plate which are reached by the electrolyte, including not only the area that may be touched by the hand but the superficial area of the pores in the plate as well. The substance for strengthening the structure of the plate should preferably partially fill some or all of the pores of the plate.

A variety of substances may be used for strengthening the plate structure. For instance, I may employ a material applied upon the plates in the form of a liquid or paste having the property of subsequently hardening in contact with the surface and particularly in the pores. Glue or plaster of Paris will serve for this purpose by way of example. As another alternative I may provide a mixture of substances which would react upon each other chemically to deposit particularly within the pores a formation that will increase the physical strength of the plate. As a further and preferred alternative I may treat the battery plate with a substance that will react chemically upon parts of the surface of the plate to produce a compound of lead which has the required physical strength.

Whatever substance is used for strengthening the structure of the plate and by whatever process the same may be applied the strengthening formation should be of a character such that it will not be attacked by the atmosphere to destroy or impair its efficacy while the plate is being shipped or stored in dry state. The strengthening formation performs its main function while the plates are being shipped or stored in dry state. I prefer to provide the strengthening formation of a material substantially insoluble in the electrolyte and chemically inert thereto but it is apparent that the invention might be carried out by the use of a substance soluble in the electrolyte providing the physical or chemical solution formed is harmless and does not impair the normal operation or life of the battery. The physical formation of the strengthening substance is preferably one of considerable compactness to materially strengthen the plate and, such formation ordinarily will be impervious to the electrolyte when the battery is assembled. However, if desired the strengthening formation might be made of a material pervious to the electrolyte in which event the active surface of the negative plate would not be materially reduced by treatment according to my process.

The use of a strengthening formation impervious to the electrolyte depends for its efficacy upon the well known fact that in ordinary storage battery practice and construction the new negative plate has a large capacity above that which is necessary to discharge the corresponding positive plate.

In carrying out my process particularly where the strengthening formation to be deposited or generated is impervious to the electrolyte, I apply such formation to such fraction of the total surface of the plate as to leave uncovered and exposed to the action of the electrolyte sufficient of the negative plate surface to completely discharge the positive plates. By this means although I reduce the active surface of the negative plates it is excess surface only that is eliminated and this for the useful purpose of gaining strength and reducing brittleness. The capacity of the battery is in no way diminished as this capacity is equal to that necessary to discharge the positive plates and this capacity remains the same as that of a battery of similar construction not subjected to my new process.

A preferred embodiment of my process consists in applying to the surface of the plates dilute sulphuric acid preferably in the form of a fine spray or mist. This process is carried out in the presence of air whereby the active lead metal will become sulphated where touched by the acid, the sulphate of lead tending to fill the pores of the active metal and cover other parts of the plate to afford the mechanical support desired. This process might be so arranged that only a fraction of the outside surface as distinguished from the pores of the active metal would be sulphated, the sulphate acting to support and contain the unchanged spongy metal inside of it, or again, approximately, the same proportion of the surface active material might be acted upon in general throughout the whole surface including that of the pores, thus producing the effect of strengthening and hardening the structure of the active metal as a whole. In whichever manner the process is carried out, it is important that the sulphating action be conducted to leave intact a proportion of the surface area sufficient to completely discharge the corresponding positive plate.

The excess surface of the negative plate in commercial practice is sufficiently large to permit material strengthening of the negative plate where the sulphating action is confined to the excess proportion of the total area of the negative surface including that of the pores.

In the accompanying drawings I have shown diagrammatically an apparatus for carrying out my preferred process. In the drawings 1 represents a belt or similar conveyance connected with clamps 2 so arranged that they can be quickly and readily attached to the lugs 3 of the negative plates 4 that are to be treated. Preferably two identical containers 5 holding dilute sulphuric acid 6 are employed and disposed on opposite sides of the plates. The sulphuric acid containers are shown by way of example as having each a stopper 9 through which extends a pipe 7, for admission of air to the interior, and a jet 8 extends through the stopper from near the bottom of the container. When air pressure is supplied through the tubes 7 the acid is atomized at the jets 8 and impinges on the flat surfaces of the negative plates as they are passed along by moving the belt 1 at an appropriate rate of speed. In practice, the spray will be produced with such intensity and the belt shifted at a rate of speed such as to cause the formation of the lead sulphate upon an appropriate fraction of the total surface area not greater than the excess beyond that required to discharge the positive.

It will be understood that although I have specifically disclosed a method of treating storage battery plates previously dried by the process of my patent No. 1,310,871 or some other equivalent process, the drying and the strengthening treatment might if desired be carried on simultaneously. Where the plates are dried and the sulphuric acid is sprayed upon the surface at the same time or in the same container, it will be apparent that the acid being itself a drying agent will assist the drying process while also acting upon the lead chemically to form the strengthening sulphate.

I claim:—

1. The process of treating negative storage battery plates for increasing the mechanical strength thereof, which consists in disposing a mechanically stronger substance into intimate contact with parts of the surface area thereof.

2. The process of treating negative storage battery plates for increasing the mechanical strength thereof, which consists in disposing a mechanically stronger substance within pores of the plate, and into intimate contact therewith.

3. The process of treating negative storage battery plates to mechanically strengthen them for dry storing and shipping, which consists in applying thereto a medium for causing the generation of relatively hard and strong surface formations upon the plate inert to the electrolyte to be employed.

4. The process of treating the active material of negative storage battery plates when in a dry and almost wholly metallic state, which consists in applying thereto a medium that will enter the pores and generate therein relatively hard and strong formations inert to the electrolyte to be employed.

5. The process of treating negative storage battery plates for increasing the mechanical strength thereof, which consists in disposing a mechanically stronger substance into intimate contact with parts of the surface area thereof, leaving exposed to the electrolyte when in use sufficient area to discharge the corresponding positive plate.

6. The process of treating the active material of negative storage battery plates when in a dry and almost wholly metallic state, which consists in applying thereto, a medium that will enter the pores and generate therein relatively hard and strong formations, the process being carried out to an extent to leave exposed to the electrolyte when the battery is assembled sufficient active area to discharge the corresponding positive plate.

7. The process of treating the active material of negative storage battery plates when in a dry and almost wholly metallic state, which consists in performing at the surface thereof a chemical reaction of a character to produce a formation of a relatively hard and strong substance in intimate contact with a portion of said surface.

8. The process of treating the active material of negative storage battery plates when in a dry and almost wholly metallic state, which consists in applying thereto a substance which will react chemically with the surface of said plates to form a relatively strong product in intimate contact with a portion of said surface, the process being carried out to a degree to leave exposed to the electrolyte when the battery is assembled sufficient active area to discharge the corresponding positive plate.

9. The process of treating the active material of negative storage battery plates when in a dry and almost wholly metallic state, which consists in applying thereto sulphuric acid to sulphate the surface of said plate to a degree to leave exposed to the electrolyte when the battery is assembled sufficient active area to discharge the corresponding positive plate.

10. The process of treating the active material of negative storage battery plates when in a dry and almost wholly metallic state, which consists in spraying thereon sulphuric acid in the presence of air, to form lead sulphate in the pores of the plate, said process being continued to a degree to leave exposed to the electrolyte when the battery is assembled sufficient active surface area to discharge the corresponding plate.

Signed at New York in the county of New York and State of New York, this 3rd day of April, 1920, A. D.

HAROLD M. MARTIN.